Feb. 17, 1959 E. H. CLARK 2,873,837

AUTOMATIC CODE TRANSLATING SYSTEMS

Filed Oct. 17, 1955 5 Sheets-Sheet 3

Feb. 17, 1959 E. H. CLARK 2,873,837

AUTOMATIC CODE TRANSLATING SYSTEMS

Filed Oct. 17, 1955 5 Sheets-Sheet 5

United States Patent Office 2,873,837

Patented Feb. 17, 1959

2,873,837

AUTOMATIC CODE TRANSLATING SYSTEMS

Edgar H. Clark, Flushing, N. Y.; Edgar H. Clark, Jr., executor of said Edgar H. Clark, deceased, assignor to said Edgar H. Clark, Jr., Washington, D. C.

Application October 17, 1955, Serial No. 540,943

39 Claims. (Cl. 197—20)

The invention relates to automatic code translating or converting systems and particularly to systems of this kind in which a message recorded in code of a primary code system may be automatically translated for recording in characters of generally used letters, numerals and signs or for conversion into a different code system.

The invention is closely related to the translating and recording systems disclosed in my Patents 2,351,663 issued on June 20, 1944 and 2,283,538 issued on May 19, 1942.

It is a principal object of the invention to provide a translating system of this type which is fast operating, simple and reasonably inexpensive in first cost as well as in operation and maintenance.

It is a further object to provide a system of this type which is flexible, so that changes in code or additions thereto may readily be made in the field and also so that it may readily be adapted initially for use in various specific fields.

It is a further object to provide a system of this kind which lends itself to subdivision into duplicate elements in any of several equipments thereof, which elements thus may be standardized to reduce cost of manufacture and to simplify installation in the equipment.

In accordance with a main feature of the invention the system is comprised of a translating equipment responsive to an incoming code, an outgoing code spelling equipment responsive to selective settings of the translating equipment and a sequence control equipment responsive to selected settings of the spelling equipment and effective in transmission of the code elements of selected outgoing codes in their predetermined order or sequence.

In accordance with an important feature of the invention the translating equipment is divided into two main divisions responsive in accordance with the incoming code assignments, and the equipment includes discriminating means for always permitting response of one division before permitting response of the other in order to prevent response of both.

In accordance with another important feature of the invention both divisions of the translating equipment are responsive to vowel elements of the incoming code.

In accordance with a more specific feature the translating equipment is built up of a plurality of interconnected standardized units, so that units may be added or modified without affecting other units.

In accordance with another main feature each selected setting in a translator unit for an outgoing code is transferred to an associated spelling unit in the outgoing code spelling equipment, which spelling unit may initially be equipped with control means for impressing any one desired combination of outgoing code elements upon the sequence control equipment.

In accordance with a more specific feature the spelling units are constructed in a few standardized sizes so that they may readily be interchanged for change in assignment of codes to the translating elements in the translating equipment.

In accordance with another main feature the sequence control equipment has a large number of sequence units arranged in a long series, each unit representing an outgoing code element and several units distributed along the series representing the same code element, as required by the frequency of its use.

In accordance with a more specific feature each sequence unit is operated by individual control means located in several spelling units in the outgoing code spelling equipment, thereby rendering it responsive to selective settings at various points in the translating equipment.

In accordance with another specific feature each sequence unit has an individual control path for impressing its code element upon the outgoing system and is included in a series of units for sequential operation of selected units down along the series.

In accordance with another feature the series of units includes one or more end units any one of which may be operated at the end of a series of sequence units operated for sending an outgoing code, said end units advancing the whole translating system one step for response to a succeeding incoming code.

The invention involves several other specific features both in respect of organizational arrangements and of mechanical details; such features will appear from the following disclosure in description and drawings.

It should be understood that the system provided in accordance with the invention, as disclosed in the following description and attached drawings, may be modified in various respects without a departure from the spirit and scope of the invention which is defined by the attached claims.

GENERAL DESCRIPTION OF THE SYSTEM

The system provided in accordance with the present invention is adapted for translation and recording of a code message which has been impressed upon a primary medium.

In a preferred form of the invention, as disclosed hereinafter, the system is of the pneumatic type which utilizes valves and bellows operated over air passages for operation in coordination with suitable mechanical devices, in a manner similar to that disclosed in my Patent 2,351,663. The system in this form is therefore particularly adapted to respond to code messages which have been recorded as holes or punchings variously distributed in successive rows across a tape in accordance with corresponding letter codes. A code message recorder for this purpose is disclosed in Patent 2,351,663, referred to above, together with details of a standard code system for which the present system in its preferred form is particularly adapted.

However the system may, within the scope of the invention, be responsive to code messages recorded in other ways. Thus, instead of by holes in the recording tapes, the message may be recorded for example by embossings in the tape for mechanical responses, or by color spotting for light sensitive responses, or by magnetic impressions in a metal tape.

The system is furthermore particularly adapted for impressing the code message in translated form upon a typing machine of standard construction, but particularly of the kind which may be operated by pneumatic means. For some details of a typewriter of this general type reference may be had to Patent 2,351,663.

However the principles of the invention are applicable to other types of systems and operations than those just referred to. Thus the system may be operated electrically throughout, as by relays and solenoids in coordination with suitable mechanical devices in a manner similar to that disclosed in my Patent 2,283,538. It is furthermore possible within the scope of the invention to combine the functions of pneumatic devices with those of electrical devices for operation of mechanical devices for the full and efficient utilization of their different operating features, space requirements, need for duplication and costs.

The system is furthermore readily adapted to receive code messages from and impress translations upon devices other than those of the general types referred to.

The principal elements of the system include a code reading device in which the prepared code tape is placed, a translating equipment for translating the recorded code into mechanical settings representing the outgoing code, a code spelling equipment for spelling out the outgoing code and transferring it to a sequence control equipment, which in turn impresses the individual code elements upon a receiving device or other suitable apparatus.

The code for which the present system is specifically devised has been fully described in Patent 2,351,663. The system may however readily be modified to operate with other codes.

In accordance with the present coding plan a fixed Full Spelling code is provided which involves the punching of a hole in the record tape for some individual letters or signs or of two, three or more holes in a single row across the record tape for each of other individual letters or signs.

For this recording words are divided into syllables and the letters of each syllable are simultaneously recorded in a single row across the tape. The syllables of a word are thus recorded in successive rows and a space punching is included with the last syllable.

In view of the simultaneous appearance of several punchings in a single line across the tape the code provides for a sequence which is universally applicable to practically all syllables in any modern language.

Thus confining the explanation to the English language the syllables in Full Spelling each contain one or more Vowels which may be preceded by Initial consonants and succeeded by Final consonants. Nearly all consonants appear in each of these two groups. In each group the characters are furthermore arranged in a certain sequence from left to right. Thus, with the letter groups Initial, Vowel and Final arranged from left to right and the letters in each group arranged from left to right through the entire system, each full syllable may be recorded in a single row on the record tape, translated and transferred by single steps and finally printed one character at a time, and successive syllables may be similarly treated and printed by the provisions of the present system.

In cases when letters in a syllable appear in an order different from that established by the code it may be necessary to record one letter at a time, that is, in each row across the tape.

For details of these letter combinations and sequences reference may be had to Patent 2,351,663.

In accordance with the present code plan provision is also made for abbreviated spelling for the sake of speeding up the recording. Thus what is termed Phonetic spelling involves the use of a single or a few letters to represent a whole syllable or a whole word, and in what is termed Phrasing one, two or a few letters may represent a long word or two or more words in frequently used combinations or phrases. The letters appear in a single row on the tape.

For examples of codes which are frequently used in Phrasing and Phonetic reference may be had to Patent 2,351,663.

The code reading device which holds the record tape is described in some detail in Patent 2,351,663 where it is illustrated in Fig. 8A.

The device comprises in the main a pair of spaced rollers for passing a long record tape, which may be of paper. A stepping arrangement is associated with one roller for advancing the tape. Between the two rollers the tape passes over a smooth reading bar, which has a series of air holes or reading vents through it in alinement with rows of perforations across the tape. The vents are put under suction each time the tape has been stepped to a new position. The tape normally closes the vents so that the suction may be maintained. When a perforation or punching stops over a vent, air will be admitted for the operation of an associated power device, such as a bellows.

The bellows thus associated with corresponding air or reading vents in the code reading device are part of the translating device.

This device may be designed in many different ways, the main principle being that of two sets of elements disposed more or less at right angles to one another, so that each element in one set will cross all elements in the other. One set of elements, the primary or code receiving bars, are operated by the bellows referred to in response to the presence of punchings in the record tape. Thus one or more bars may be operated at one time from their alternate position in response to punchings in a single row across the tape. Such bars are returned to normal at the time the tape is advanced and the punchings removed from the vents.

The other set of elements, the secondary or code reading bars are operated selectively in accordance with the settings in the code receiving bars.

For references to different types of translating devices suitable for the present purpose Patent 2,351,663 may be consulted.

The translating equipment is divided into two main divisions, one for Full Spelling and the other for Phrasing and Phonetic. This second division will be referred to hereinafter as Phonetic. The two divisions may however overlap to some extent, thereby permitting double use of some apparatus.

The secondary bars in the Full Spelling translator are arranged in the same sequential order, say from left to right, as prevails in the coding plan. Thus bars responsive to settings from Initial punchings may be furthest to the left, the Vowel bars may be next and the Final bars furthest to the right. In this manner the code sequence may be advanced through the Full Spelling section of the translator to the spelling equipment.

As to the secondary bars in the Phonetic section of the translator the same general sequence arrangement may be used, but here each code combination is considered by itself with its own code elements arranged in the general order.

The outgoing code spelling equipment serves to spell out the outgoing code elements, assigned to and represented by the individual secondary bars in the translator, by impressing such code elements upon the sequence control equipment. Thus each bar, when selected, operates a spelling unit which controls the suction passages for one or more sequence valve units in accordance with the selected code.

The sequence control equipment comprises a long series of control valve units which directly control the output from the system. Each control valve unit represents an outgoing code element and is operated from the spelling equipment. Each valve unit is effective in operating a corresponding letter unit in the receiving device, which may be a key bar in an automatic typewriter or some intermediate transmitting element for such a typewriter more or less remote. Each control valve unit furthermore controls the sequence timing for the operation of all subsequent units in the long series, so that only one character in the receiving device will be operated at a time.

The fundamental sequence from left to right is maintained in the sequence control equipment, inasmuch as the characters represented in each spelling unit in the spelling equipment are also represented by control valve units in the sequence control equipment, which are disposed along the series in the original sequence though separated by many other valve units.

In the series each element in the outgoing code system is represented by varying numbers of valve units dependent upon the frequency of its use. The first criterion is that there must be enough pertinent units to spell out fairly long phrases. The second criterion is that for such phrases or for complex syllables the required characters must be available in the fundamental sequence so that they may be reproduced in their proper order.

In the present system there is one code receiving or primary bar in the translator equipment for each air passage in the tape reading bar. Since all of these primary bars must be available both for Full Spelling and Phonetic it is necessary to provide some form of discrimination between these two uses of the same set of primary bars.

In Patent 2,351,633 the discrimination was determined by the presence or absence of a vowel in the symbols recorded in a single row across the tape. This provision does put limitations upon the choice of symbols representing whole words or phrases.

In the present main system this discrimination simply depends on whether the symbol combination set up in a single row across the record tape is one which will have a corresponding appearance in the Phonetic division, so that a secondary bar in that division will respond thereto.

The need for such discrimination is due to the fact that the Full Spelling division of the translator has its secondary bars grouped in three groups, namely Initial, Vowel and Final, where a translation is performed independently in each by corresponding primary bars and secondary bars, unaffected by settings of primary bars in the other two groups, whereas in the Phonetic or Phrasing division of the translator settings of all operated primary bars combine to select a single secondary bar.

It will thus be seen that without such discrimination a code for setting of primary bars in all of the Initial, Vowel, Final groups in Phonetic for selection of a secondary bar might very well also select secondary bars in any one or two of these groups in Full Spelling, since each group there is independent of the other. It must therefore be prevented that code readings be impressed upon secondary bars in Full Spelling before Phonetic has been tried.

In the present system, therefore, the Phonetic division of code reading or secondary bars is rendered responsive before the Full Spelling division, so that secondary bars in the Phonetic division will have first choice and, if one is selected, will prevent operation of the Full Spelling division all together. Such stepwise operation may be attained by any suitable mechanism, as by a timing device. The Phonetic division is given preference in this arrangement since it will be used more frequently.

The general description so far has referred to the code vents in the tape reading bar as representing letters for spelling words. These code vents may of course represent any symbol which can be reproduced on a receiving device. Thus the code holes may represent "upper" and "lower" cases of the same symbols, and they may represent different sets of symbols. For the sake of use in standard typing service, the symbols may be included in a complete set of "figures" "signs" and "stunts" which are divided into two groups, one group corresponding to "upper" case and the other to "lower" case of these symbols.

Thus the system is preferably operated normally for "lower" case letters, but may be switched to any of the other three classes by preceding any code setting by a case control code which will be transmitted through the system to control a corresponding case bar in the receiving device, such as a typewriter.

For a fuller understanding of the invention reference may be had to the following detailed description which should be read in conjunction with the attached drawings.

Figs. 1, 2 and 3 show a diagrammatic layout of the whole system in accordance with a preferred embodiment thereof in which:

Fig. 1 shows the tape reading device and part of the translating equipment;

Fig. 2 shows part of the outgoing code spelling equipment; and

Fig. 3 shows part of the sequence control equipment and some typewriter keys and bars.

Figure 1:
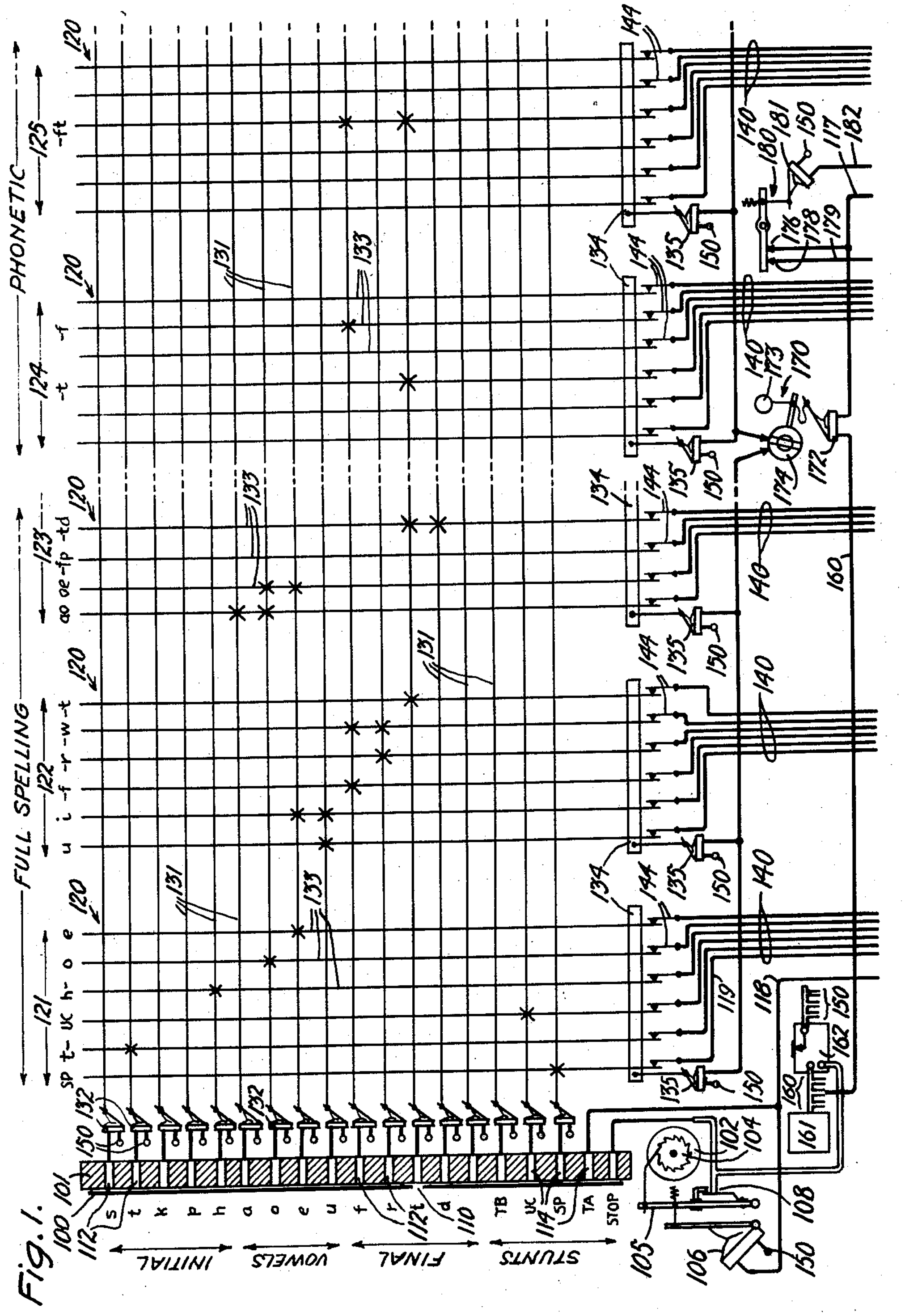
Figure 2:
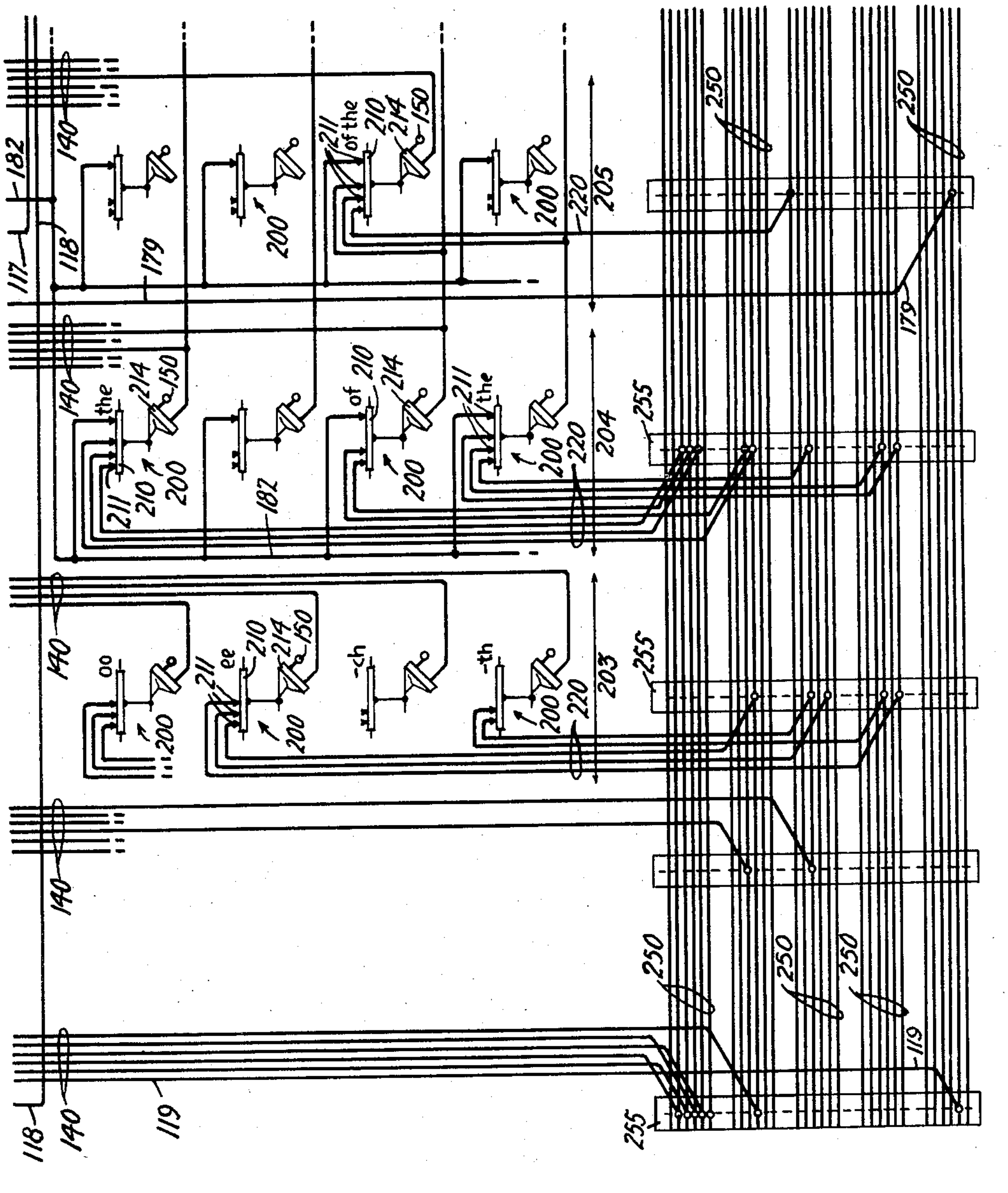
Figure 10:
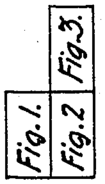
Figure 3:
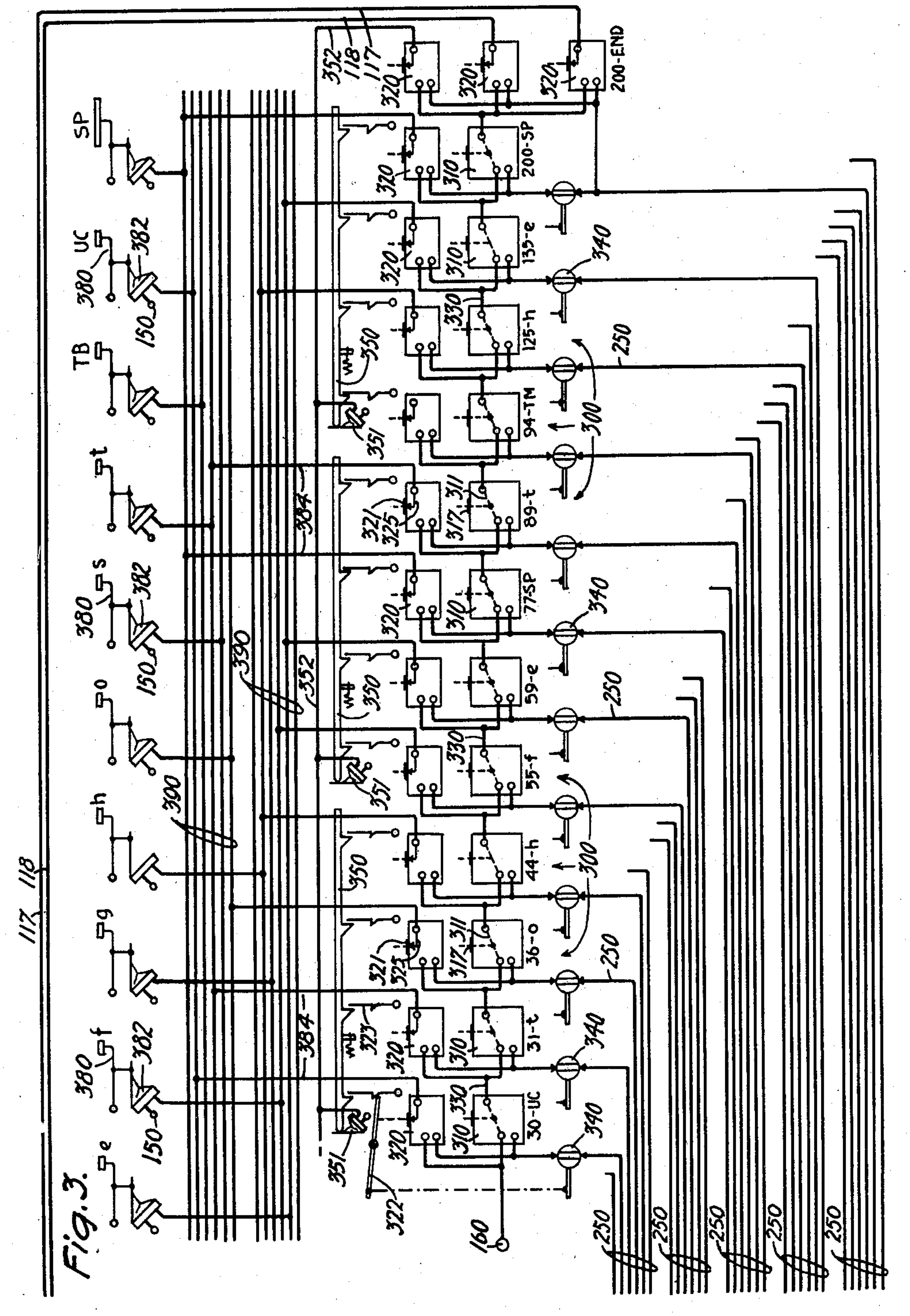
Figure 4:
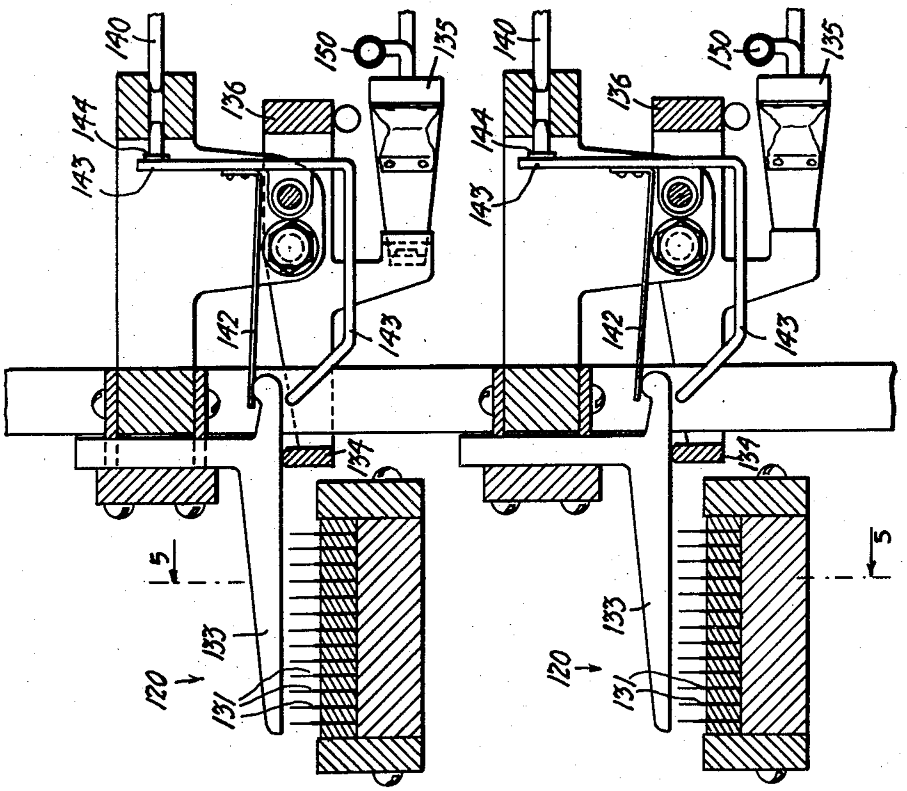
Figure 5:
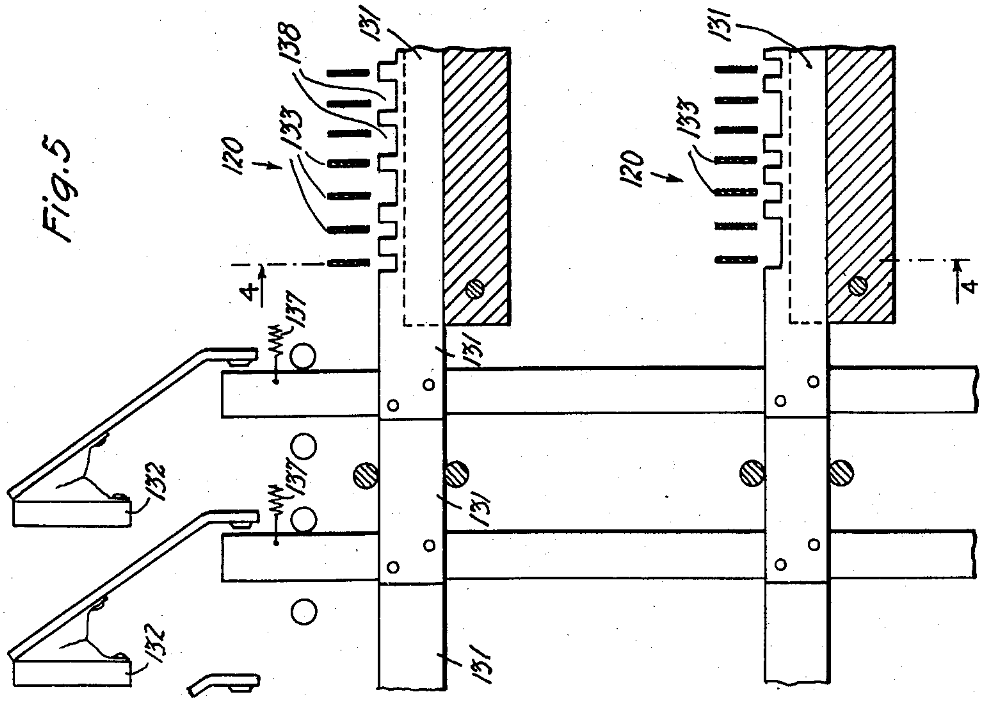
Figures 6, 9:
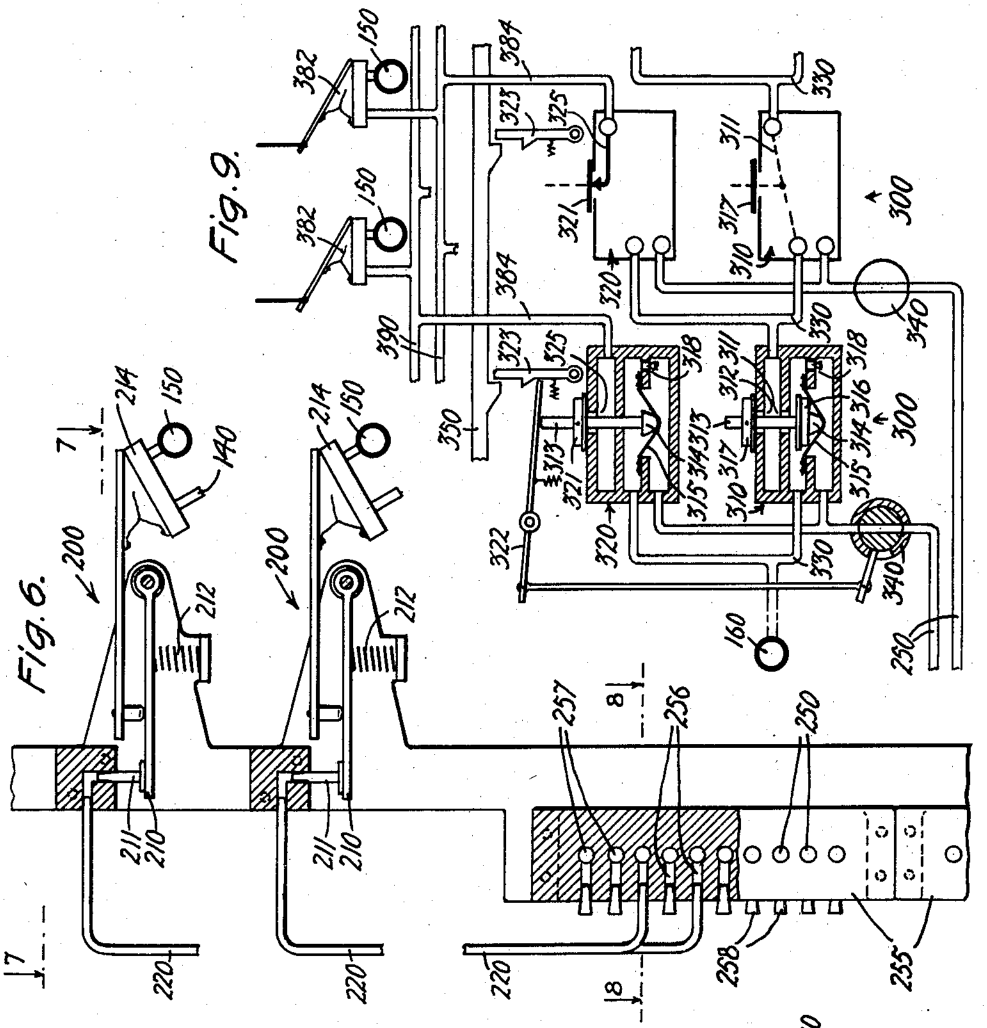
Figure 7:
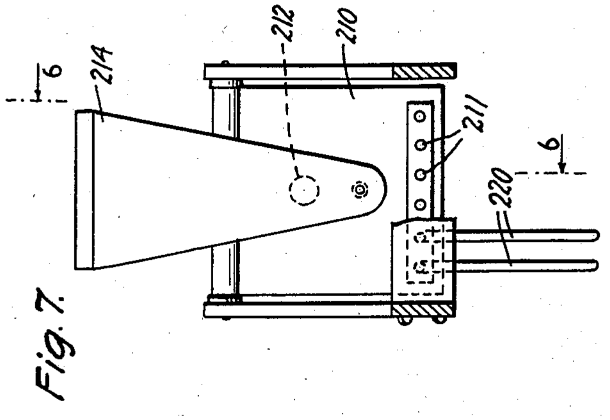
Figure 8:
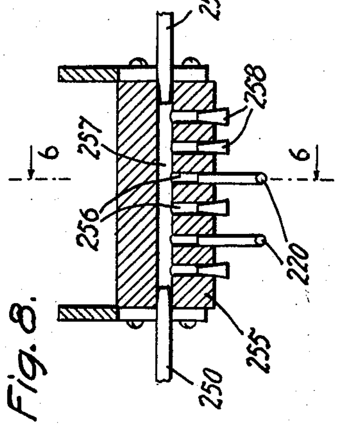

Figs. 4 and 5 show details of the translator structure, the cross sectional portions being taken on lines 4—4 and 5—5 in Figs. 5 and 4;

Figs. 6, 7 and 8 show details of the outgoing code spelling units, the cross sectional views in Figs. 7 and 8 being taken on lines 7—7 and 8—8 in Fig. 6;

Fig. 9 shows schematically details of the valves used in the sequence units together with some directly associated parts of the system;

Fig. 10 shows how Figs. 1, 2 and 3 should be placed together to show the system.

*Detailed description of equipment*

The code or tape reading device is shown diagrammatically to the left in Fig. 1. For details of this device reference may be had to Patent 2,351,663. The record tape 100 and reading bar 101 are shown in cross-section through the record row of code punchings 110 (only one shown) and the row of reading vents or air passages 112. At the lower end of bar 101 is shown the tape driving roller 102 with ratchet wheel 104 and stepping lever and pawl 105 for advancing the tape one row at a time on the back stroke of the pawl. The lever 105 is operated by the tripvalve controlled bellows 106 against a return spring, and it controls an air vent 108 for de-vitalizing most of the system during the stepping operation and restoring the system for functioning upon return to normal and positioning of a new record row.

The translating system is shown schematically in Fig. 1. However some of the more essential mechanical details are shown in Figs. 4 and 5.

As will appear in Fig. 1 the system is sectionalized into a plurality of translator units 120, some of which are set by the Full Spelling codes and others by the Phonetic codes, which will hereinafter be considered as including Phrasing codes. Thus the units may be standardized in manufacture as far as general structure is concerned. But the code cuttings for translations must of course be treated individually. Two such units are shown mounted together in Figs. 4 and 5, as a matter of example.

Each translator unit mainly comprises: a set of primary or code receiving bars 131 with their individual operating bellows 132 operated from the reading bar 101; a set of secondary or code reading bars 133 disposed at right angles to and vertically above the primary bars 131; a common operating structure or testing bail 134 which lifts all the bars 133 and is mounted for admitting the bars 133 into testing contact with the bars 131 by means of operating bellows 135.

As shown in Figs. 4 and 5 the secondary bars 133 are mounted horizontally above the primary bars 131, so that they may drop by their weight for testing of the settings of the primary bars. It should however be understood that the secondary bars may be operated by other means for the testing functions. The bars may thus be under individual spring pressure continuously or only during the testing and operating period, being admitted by the common testing bail for this purpose. In such case the planes of the primary and secondary may of course be vertically disposed.

The primary bars 131 in all units of Full Spelling and Phonetic are responsive to the punchings in the code tape and corresponding primary bars in the different units may be mechanically intereconnected to be operated simultaneously by a bellows 132. The bars are operable lengthwise between normal and selected positions. The upper edge of each bar has notches 138 cut relative to the crossing secondary bars in accordance with code requirements. Thus in general there is normally a notch below the straight edge of each secondary bar to permit the latter to be fully lowered without operation of the primary bars. However at the crossings of a primary bar with any of its assigned secondary bars the notches are normally placed in the alternate or selected position of the primary bar, which thus must be moved to permit any one of the assigned secondary bars to be lowered into its alternate or selected position. Thus normally each secondary bar is blocked at one or a few primary bars. When these are operated one secondary bar is admitted by them, but all other secondary bars are blocked by them.

Within the scope of the invention and as pointed out in my patent 2,351,663 the selective action between the primary and secondary members may be determined by coded formations either in the primary members or in the secondary members, the other member being neutral.

The secondary bars 133 are guided to move downward by their own weight. They are held up clear of the notches 138 by the counter balanced testing bail 134 which carries a counter weight 136 for this purpose; a spring may of course be used. The bellows 135, when operated, overcomes the unbalance so that all bars 133 will be lowered; all unselected bars move a short initial distance only and one bar 133, which finds a clear path, will move the full distance into the notches. Each bar 133 is associated with suitable means for controlling a vent for an individual air passage 140, normally under suction, leading to the outgoing code spelling equipment in Fig. 2, which means includes a spring 142 which permits the bar to move the initial distance without affecting the air passage 140. When the car continues downward beyond this point the spring is rendered ineffective and the air vent 144 will be opened by positive action of lever 143. On returning to normal the spring will hold the air passage closed, by pressure from the secondary bar 133 held in upper position by the counter weight 136.

The reading bar 101 has 21 vents 112 for translation of a group of single letters or a group of figures and signs used in Full Spelling and requiring change of translation from one of these groups to the other and also requiring shift between upper and lower cases. The Full Spelling division of the translator thus must have 21 primary bars besides a few control bars for selections of group and shift, which selections pass through the system for control of corresponding Stunts in the final typewriter. Only a sufficient number of vents 112 and primary bars 131 are shown in Fig. 1 as examples for a full understanding of the invention.

The coding further provides for the simultaneous use of two, three or four of the same 21 vents 112 for the selection of other single letters for which there are no keys in the code recording machine nor vents in the reading bar. These may appear in upper and lower cases, but not in the figures and signs groups.

In order that the alphabet may be covered by the coding the settings of the 21 primary bars should result in selections among 21 Initial, 5 vowels, 21 Final characters.

There should accordingly be a corresponding number of secondary bars 133 for single letters and a few for Stunts, making a total of about 50, in the Full Spelling division.

The coding further provides for the use of different combinations of two to six of the vents 112 for the simultaneous selection of two or three letters, including double letters, also as used in Full Spelling; these too may appear in upper and lower cases, but not in the figures and signs. The total number of such two or three letter combinations may be 8–10 Initial, 5 vowels, 12–15 Final, making a total of up to 30 secondary bars 133 for multiple letters.

Thus a few standardized units 120 may be provided for these secondary bars in Full Spelling with about 25 primary bars connected together between the units. For example, two units 121 and 122 may be used for all secondary bars representing single characters and one unit 123 may be used for all two or three letter secondary bars in Initial, Vowels, Final. All code cuttings in the primary bars are of course different and in the three units the Initial bars cooperate, the Vowel bars also and the Final bars too. These three sections of bars are however independent and may supplement each other in any single setting effected by a row of punchings 110 on the reading bar 101.

Other size units may be used and the bars may be differently distributed within the scope of the invention. It should be understood that the three sections of Initial, Vowels, Final secondary bars are not necessarily separated into the three or more mechanical units 121, 122, . . .; for the sake of simplification the bars should however be grouped.

It should be noted here that the Full Spelling division of the translator is not made responsive to a single character punching appearing in a row across the record tape 100. Such single punchings are reserved for use in the Phonetic translator which, by the discrimination feature of the present system will respond thereto. Thus a syllable must be represented by at least two punchings in one row for response in Full Spelling.

It is even possible to provide that letters which each require two or more punchings should be accompanied by the remaining letters needed for recording of a whole syllable, in order to free also such combination punchings for use in Phonetic.

In the Phonetic division of the translator similar units 124, 125, etc., may be used and the 25 primary bars are connected together between the units for simultaneous operation. These connections between corresponding bars may be mechanical, or else individual bellows operating simultaneously may be provided for this purpose. Each unit here may have the same number of secondary bars as in Full Spelling.

As many Phonetic units may be used as needed for any business requirements and units may be added when additional code combinations are adopted.

The code cuttings in the primary bars in the Phonetic division are entirely arbitrary and are made in accordance with the requirements of any Phonetic or Phrasing codes that are included in the system at any time. Any single punching or any combination of punchings appearing in a single row across the record tape 100 may be used for setting the primary bars.

Each setting of one or more primary bars will select one secondary bar which thus represents a single word or any number of words, a formula of symbols, together with any stunts, such as spacing. Common practice alone puts a limitation on the length of the phrases, which for ordinary letter writing would not include more than 3–4 simple words.

In accordance with a feature of the invention a requirement is that the code combinations used in Phonetic should not include those used in Full Spelling for whole words or syllables. However since many codes in Phonetic would find response in one or two sections of the Full Spelling division, the Phonetic is given first chance for testing the setting of the primary bars, and only when no secondary bars responds here will the testing be transferred to Full Spelling for setting of two or three secondary bars there. The sequence of testing is controlled by a suitable timing arrangement 170 which is started for each new operation of the system, and which either will be stopped and restored by the operation of a secondary bar in Phonetic or will continue till it admits secondary bars in Full Spelling for testing.

The outgoing code spelling system is shown schematically in Fig. 2. It comprises a plurality of spelling units 200, one for each secondary bar 133 in the translating system, except those representing single letters in Full Spelling. The units 200 may be arranged in groups, one group for each translator unit 120. Thus there are no units 200 for the two single letter translator units 121, 122. There are groups of units 203, 204, 205, etc., for corresponding units 123, 124, 125, etc., in the translator. Each group may contain 30 units 200.

Details of two spelling units 200 are shown in Figs. 6 and 7.

Thus each unit comprises a pivoted code vane 210 for normally closing a plurality of vents 211 for air passages or tubings 220, normally under suction, leading to the sequence storing equipment in Fig. 3. The vane 210 is held against the vents by a spring 212 and is operated by a trip valve controlled bellows 214 to open all the vents simultaneously. The bellows 214 of the units are controlled by the secondary bars 133 to be operated when the air passage 140 is opened in response to the full movement of a selected secondary bar (see Fig. 4).

It should be understood that the pivoted vanes 210 may be operated through mechanical means connected directly to the associated secondary bar 133 without a departure from the spirit of the invention.

Each suction tubing 220 represents a symbol or stunt included in the code represented by the associated secondary bar 133. Thus if that code includes, say, four letters and SP for spacing the vane 210 will control five tubings 220.

For the sake of standardization the units in group 203 may be designed with vents for six tubings 220 each, whereas those in groups 204, 205, etc., may be designed in two different sizes with, say 10 and 20 vents each. For codes in Phonetic requiring a still larger number of passages two or more units 200 may be operated simultaneously from one secondary bar 133 in the translator.

The connections for the air passages 220 to the sequence storing equipment in Fig. 3 are shown in a sequence tubing multiple along the bottom of Fig. 2.

The horizontal lines represent a large plurality of suction tubings 250, one from each sequence valve unit 300 of the sequence storing equipment, thus representing, corresponding outgoing symbols in the ultimate typewriter. Each outgoing symbol (or stunt) may however be represented once, twice or several times and may thus appear in different portions of the line-up of tubings 250. The order of the tubings 250 is preferably the same as that of the sequence valve units, and it is not alphabetical but is determined by the requirements of the language.

Thus for connection of the air passages or tubings 220 in accordance with code requirements in each case, a multiple connecting rack 255 may be provided for each of groups 203, 204, 205, etc., and for each of the groups of air passages 140 from translator units 121 and 122.

A suitable multiple rack is shown in Figs. 6 and 8. Each rack 255 has a cross passage 257 for continuation between adjacent portions of each tubing 250 and has a few branch passages 256 for a few tubings 220 from the spelling units. Wherever no tubing 220 is connected the opening 256 should be closed with a suitable plug 258. Each tubing 250 might have up to 10–12 connections 220 in one rack, but with proper distribution between appearances in the racks of the more frequently used letters the number of openings 256 for each tubing 250 in one rack may be held down, say to six; connections in excess of this number may of course be made in an adjacent rack.

The sequence control equipment is shown schematically in Fig. 3 together with a schematic showing of the more pertinent elements of the ultimate typewriter, which appear along the top of Fig. 3.

A typewriter will have some 40–45 keys or levers 380 which must be operated by individual bellows 382. About half a dozen keys are for operation of Stunts, and the remaining for symbols, such as letters, numerals and signs.

The sequence control system is connected between the outgoing code spelling equipment and the typewriter to receive in one setting thereof the spelled-out code for one row of punchings 110 in tape 100 and to impress the individual symbols in such setting, one at a time, upon the typewriter for typing and Stunts.

The system comprises mainly a long series of similar control valve units 300 having their input side connected to individual suction tubings or air passages 250 in the sequence tubing multiple. Each sequence valve unit 300 includes two trip valves 310 and 320 having an output tubing 384 connected into a printer tubing multiple 390 for the typewriter bellows 382. The valve units 300 are serially interconnected through series tubings 330 for sequential operation of such units as have been selected simultaneously by the code spelling equipment for sequential operation of the associated typewriter keys 380.

Pertinent details of the control valve units 310 and 320 are shown in Fig. 9, which shows a pair of the valves in fairly full details and another pair in more diagrammatical fashion substantially as used in Fig. 3 for simplicity.

The valve 310 has two alternate valve seats 311 and 312, the upper seat 312 being normally closed and the lower seat 311 normally open, the normal condition being here assumed to be the inactive state before the valve is selected.

The valve 310 has three chambers, upper-middle-lower, and a valve stem 313 carrying at its lower end a weight 314 weighing down the slack operating diaphragm 315 mounted between the middle and lower chambers. The stem carries two valve discs 316, 317 cooperating with the seats 311, 312 to close one or the other.

The valve 320 has one valve seat 325 which is normally closed. It has two chambers, middle-lower, and a valve stem 313 with a weight 314 and a diaphragm 315 as in valve 310. The stem carries one valve disc 321 for the seat 325.

On the input side (left) of the valves 310 and 320 the suction supply 160 is connected directly to the middle chambers of the first pair of valves 310, 320 in the series, the left hand pair in Fig. 3. With suction cut off in rest condition the two valves remain with the diaphragms weighted down. The control device, in this instance assumed to be a code vane 210, is connected to the lower chamber of valves 310, 320 over the tubing 250 in the sequence tubing multiple, the tubing being normally closed at vane 210. The middle and lower chambers are interconnected by means of a bleeder 318 so that changes in the pressure condition in the middle chambers may be comparatively slowly imparted to the lower chambers.

On the output side of the valve, the uppermost chamber is connected to output tubings, such as 330 or 384, for changing the pressure condition therein as the stem 313 is moved up or down. Thus valve 310 is connected up over the series tubing 330 to control pressure in the middle chambers of the next succeeding valves 310, 320 and the associated valve 320 is connected over tubing 384 for control of typewriter bellows 382. The series circuit 330 is repeated between all succeeding valve units, so that any one unit can control any subsequent unit right down through the series.

At the time of starting operation for a new cycle, suction is applied from supply 160 to the middle chambers of a pair of valves and is bled through bleeder 318 to the lower chambers and out into the control tubing 250. With tubing 250 closed, the suction in the middle chambers is unable to raise the diaphragms 315 and valve stems 313; consequently the valves make no response and operating circuit 384 remains closed at valve seat 325. However with tubing 250 open to air at vane 210 the diaphragms will be raised by the suction applied to the middle chambers from supply 160, air will be admitted at valve seat 312 to series tubing 330 and air will be extended through valve seat 325 to the operating circuit 384 for a bellows, such as 382, which thus will be operated by its associated trip valve. Upon subsequent closing of tubings 250 both valves and bellows will return to normal.

The valves 310, 320 may of course be used separately for various other purposes in the system and may be provided with different appurtenances adapting them to different operating requirements.

For the present purpose in the sequence control system the stem 313 in valve 320 has a locking arrangement at its upper end, which comprises a pivoted bar 322 which, when the stem is raised, will be held by a catch 323. This serves the purpose of operating a cut-off valve 340 located in the control tubing 250 for the pair of valves. The cut-off valve 340, in operating, replaces the open condition at vane 210 in tubing 250 by closing the input tubings to the lower chambers of both valves. Thus suction will build up in both lower chambers from the series tubing 330 through bleeders 318, and as the pressures reach a stage of equalization in the lower and middle chambers the stems 313 will return to normal, awaiting the next cycle.

When valve 310 returns to normal, after an interval adjustable at bleeder 318, it immediately extends suction over valve seat 311 to succeeding valve units over series tubing 330.

It should be noted that valve 310 is adjusted at its bleeder 318 to operate quickly in both directions, fitting into a tempo by the speed of the typewriter. Valve 320 is however adjusted to not respond to vane 210 until most of the succeeding valves 310 in the series have been de-vitalized over series tubing 330 by the closing of valve seat 311 in valve 310. Thus subsequent valves 320 will be prevented from operating at this time.

When the valve 320 operates and manipulates valve 340 to prevent further operation of the unit, it quickly restores and cuts off air applied at valve seat 325 for operation of the typewriter bellows 382, the timing being such that the bellows merely serves to give the type key 380 a stroke for momentum and is restored without affecting the return of the key. By such timing of both valves keys may be operated in rapid succession.

At the end of a cycle a release bar 350 will be operated to the right to release all operated levers 322 through catches 323, thereby restoring valves 340 to normal.

A typewriter tubing multiple is provided for the key bellows 382, each of which is connected to one of the multiple tubings 390. Several connections 384 from sequence valves 320 which represent a given symbol, are connected to one multiple tubing 390 for that symbol.

The "Outgoing Code Sequence" established by the sequence control equipment permits the presentation of any code translation all at once to the sequence control system for transfer of one character at a time to the ultimate typewriter. The instantaneous capacity of a system for general letter writing would, for economical reasons, be limited to accommodation of the letters involved in frequent phrases of three or four simple words. This means that the outgoing code spelling equipment should impress such a phrase in one setting upon the sequence series of valve units 300. In such a phrase, any letter, such as *e*, may appear a number of times, and all letters will appear in any order other than the alphabetic.

It is therefore provided that in the series of valve units, most letters are each represented by a few dispersed units, both so that they may appear a few times in one setting and so that they may appear before or after various other letters in that same setting. For ordinary commercial service a series of 150 to 200 valve units will suffice. The series also includes a few Stunts which may appear a few times, such as space SP for spacing of two or three words in a phrase.

The following list gives an example of a plausible series arrangement giving the sequence valve unit numbers with their assigned letters. In Fig. 3 the units shown are correspondingly marked.

OUTGOING CODE SEQUENCE

| | | | | | | | | | |
|---|---|---|---|---|---|---|---|---|---|
| 1 | 2 | 3 | 4 | 5 | 6 | 7 | 8 | 9 | 10 |
| *z* | *u* | *j* | *a* | *c* | *b* | *w* | *s* | *f* | *i* |
| 11 | 12 | 13 | 14 | 15 | 16 | 17 | 18 | 19 | 20 |
| *o* | *t* | *g* | *h* | *r* | *m* | *e* | *a* | *v* | *x* |
| 21 | 22 | 23 | 24 | 25 | 26 | 27 | 28 | 29 | 30 |
| *w* | *k* | *y* | *d* | *o* | *q* | *u* | *s* | TB | UC |
| 31 | 32 | 33 | 34 | 35 | 36 | 37 | 38 | 39 | 40 |
| *t* | *h* | *i* | *f* | *m* | *o* | *r* | *e* | *l* | TM |
| 41 | 42 | 43 | 44 | 45 | 46 | 47 | 48 | 49 | 50 |
| *l* | *d* | *c* | *h* | SP | *i* | *m* | *h* | *a* | *v* |
| 51 | 52 | 53 | 54 | 55 | 56 | 57 | 58 | 59 | 60 |
| *n* | *w* | *s* | *p* | *f* | *a* | *v* | *y* | *e* | *o* |
| 61 | 62 | 63 | 64 | 65 | 66 | 67 | 68 | 69 | 70 |
| *u* | *t* | *r* | *l* | *i* | *n* | *d* | *c* | *e* | *i* |
| 71 | 72 | 73 | 74 | 75 | 76 | 77 | 78 | 79 | 80 |
| *o* | *a* | *h* | *s* | *d* | *y* | SP | *s* | *t* | *p* |
| 81 | 82 | 83 | 84 | 85 | 86 | 87 | 88 | 89 | 90 |
| *c* | *w* | *c* | *r* | *m* | *l* | *g* | *h* | *t* | *s* |
| 91 | 92 | 93 | 94 | 95 | 96 | 97 | 98 | 99 | 100 |
| *e* | *k* | *b* | TM | *o* | *a* | *x* | *d* | *u* | *r* |
| 101 | 102 | 103 | 104 | 105 | 106 | 107 | 108 | 109 | 110 |
| *p* | *v* | *n* | *i* | *z* | *j* | *m* | *n* | *a* | *e* |
| 111 | 112 | 113 | 114 | 115 | 116 | 117 | 118 | 119 | 120 |
| *d* | *b* | *t* | *l* | *f* | *i* | *e* | *o* | *n* | *g* |
| 121 | 122 | 123 | 124 | 125 | 126 | 127 | 128 | 129 | 130 |
| *m* | *s* | *c* | *t* | *h* | *a* | *l* | TM | *y* | *l* |
| 131 | 132 | 133 | 134 | 135 | 136 | 137 | 138 | 139 | 140 |
| *o* | *a* | *s* | *z* | *e* | *d* | *i* | *t* | *u* | *e* |
| 141 | 142 | 143 | 144 | 145 | 146 | 147 | 148 | --- | 200 |
| *n* | *s* | *r* | *t* | *y* | *l* | SP | *r* | | SP |

Other mechanical elementary parts and devices are used for the proper operation and coordination in the system of the principal apparatus and sections; their construction and functioning will be described sufficiently in the following description of the detail operation of the system for the proper understanding of the invention. Most of such elements are of conventional type.

It may be stated here that the system includes a conventional suction tank 161 which is automatically kept at a substantially constant sub-pressure by a suitable pumping outfit and control equipment which form no part of this invention. These parts are unaffected by the operations in the whole system.

The system further includes a main suction distribution tubing system 150 connected to supply suction from the tank directly to various elements or devices throughout the system. This tubing system is not shown completed to all points in Figs. 1, 2, and 3, but its connection at each point is indicated by a circle marked 150.

The output tubing 160 of the tank 161 is connected to tubing system 150 through a cut-off valve 162 which is similar to valve 310 and serves to cut the constant suction from the tank off from and onto system 150 in response to operation of the stepping pawl 105 at the end of each cycle.

Certain points in the system are connected directly to the output tubing 160 of the tank. Some of these connections are not shown, but are indicated by a circle marked 160.

The bellows used in different parts of the system for performing mechanical operations are normally relaxed by a return spring usually on the element which is operated. Suction applied to the bellows will overcome the spring tension and perform the assigned operation. The application of suction is usually through a tripvalve, such as valve 320 in Fig. 9, which is much quicker in response than the bellows. The tripvalve may when necessary be locked operated by connecting the stem 313 to a locking arrangement such as 322, 323 shown in Fig. 9, to become released when the bellows completes its operating stroke.

Since this combination of bellows and tripvalve is well-known and is auxiliary to the system, the valve is included as a simple bloc in the bellows symbols used in the diagrammatical showings in Figs. 1, 2, and 3.

*Detailed description of operation*

It will be assumed that the code-reading device, Fig. 1, is in the act of taking a step for advancing the record tape 100 on the reading bar 101 after the system has performed a complete function.

As will be explained later the operation of the stepping pawl 105 for advancing the tape driving roller 102 opens the vent 108 thereby causing the operation of valve 162, similar to type 320 in Fig. 9, which in turn disconnects suction tank 161 from the suction supply network 150, thereby de-vitalizing most of the system and causing most operated elements to return to normal, ready for the next function.

Thus the lever 105 will also return to normal and close vent 108 for restoring valve 162 to normal, and suction is again applied to the suction supply network 150 for the next function.

In the following, initial consonants will be indicated thus: "*t*—," and final consonants thus: "—*t*."

It will now be assumed that the new code row on the tape 100 presents only one punching 110 to the reading bar 101, and that this punching represents the letter "—*t*," which is the code in Phonetic for the word "the."

No such single code letter can be used for response in Full Spelling.

Thus all reading vents 112 will be placed under suction, except the one for letter "—*t*."

Since these vents connect through a tripvalve, like 320, to the individual operating bellows 132 for the primary bars 131 in all the translators in Fig. 1, only the vent for letter "—*t*" in admitting air to its associated tripvalve, will operate its bellows 132. Thus a primary bar 131 for "—*t*" will be set in alternate or selected position through all the translators.

At the time suction was applied to the supply system 150 the timing arrangement 170 began to function.

This arrangement may of course take any one of several obvious forms. A preferred arrangement includes a circuit switch 174, having a normal position, as shown, and including a mechanical timing device 173 which operates to throw the switch to alternate position after a predetermined interval. A tripvalve operated bellows 172, when operated shortly after the start of a cycle, prevents the switch from leaving normal or, when operated at the end of the cycle, restores the switch and timer to normal. When the bellows 172 is released the timer begins to work.

In the normal, right-hand position, the switch 174 connects air to all the operating bellows 135 for the secondary bars 133 in the Phonetic translator units 124, 125, etc., whereas in the alternate, left-hand, position the switch 174 connects air to all operating bellows 135 in the Full Spelling translator units 121, 122, etc.

A control circuit for the timer bellows 172 is normally closed at a vent 176 in a bellows operated switching device 180, to permit this timing operation to be completed.

The arrangement is such, that when suction is first supplied to the system and air extended over switch 174 in normal position to the bellows 135, in Phonetic, these bellows will operate after a slight delay due to adjustment of their tripvalves thereby giving the primary bars time to operate before the secondary bars 133 are lowered for testing. As the testing bar 134 in each translator unit 124, 125, etc., moves down the individual springs 142 follow their associated bars 133 until these are level with the top edge of the primary bars 131.

In the present instance the secondary bar for "—*t*" in unit 124 will find a clear path to continue beyond that level and thus will engage the vent lever 143 (see Fig. 4) to open the vent 144 for an airpassage 140 to the transfer equipment. All other bars 133 will be stopped by primary bars and prevented from opening their associated vents.

In the diagrammatical showing in Fig. 1 of the translator units the crossing points between primary and secondary bars at which selections will take place are indicated by *x* in a few instances.

The airpassage or tubing 140 from the secondary "—*t*" bar leads to the tripvalve controlled bellows 214 of the spelling unit 200 for "—*t*" in the group 204, associated with translator unit 124, see Fig. 2.

In the spelling unit for "—*t*" the code vane 210 has three tubings 220, representing the assigned outgoing letters "*t*," "*h*," "*e*," connected up to the vents 211 and one tubing 182 from the switch bellows 181 connected up to a fourth vent 211. These vents are normally closed by the vane 210 and spring 212 (Fig. 6).

Thus when the tubing 140 is opened at the secondary bar 133 the bellows 214 operates on suction from 150 and the code vane 210 opens all four vents 211. This opens the tubing 182, causing bellows 181 to operate the switching device 180 for opening vent 176 for the timer 170. The bellows 172 in the timer prevents the timer from operating the switch 174 to Full Spelling. This condition prevails until, at the end of the operating cycle, suction is removed from the system and switching device 180 is restored to normal. When thereafter suction is again applied, the timing device 170 again begins its slow function, bellows 172 being released since vent 176 is closed.

It should be noted that each spelling unit 200, which is associated with the Phonetic translator has a vent for tubing 182 leading to the switching device 180 so that whenever such a unit is selected the timing device 170 will be restored and prevent operation of the Full Spelling translator. In the same manner a vent 178 on the switching device 180 will be opened in response to most Phrasing and Phonetic codes, for the purpose of adding a last Spacing to each such code.

The tubings 220 from the three code vents 211 of the vane 210 for "—*t*" lead to three openings 256 in the multiple connecting rack 255 assigned to group 204, where they connect with three suction tubings 250 which lead to three control valve units 300 in the sequence control or storing system, shown in Fig. 3.

These three valve units should represent the three letters "*t*," "*h*," "*e*," respectively, and should appear in that order in the valve series. By reference to the list Outgoing Code Sequence, given hereinbefore, it will be seen that such three units may be picked in different ways, such as

| | | | | |
|---|---|---|---|---|
| | **12**–*t*, | **14**–*h*, | **17**–*e* | |
| | **31**–*t*, | **32**–*h*, | **38**–*e* | |
| | **62**–*t*, | **73**–*h*, | **91**–*e* | |
| or | **12**–*t*, | **32**–*h*, | **91**–*e* | a.s.o. |

The series thus provides considerable freedom in choices so that a short word, such as "the," may be placed before or after other short words in one single setting in the sequence series of valves, as for frequently used phases.

As shown in the drawings the connections on the rack 255 are made for valve units 31–*t*, 44–*h*, 59–*e* in Fig. 3.

When, at the beginning of the operating cycle, the system was de-vitalized spelling vanes 210 were released so that all valve units 300 were returned to normal. When suction is applied from the suction supply 160, at extreme left in Fig. 3, it is steadily extended through the middle and upper chambers of the first valve 310 and over the series tubing 330 to the middle chambers of the next valves, 310, 320, through middle and upper chambers of this valve 310 and over the next series tubing 330 a.s.o. (for details see Fig. 9).

With all the code valves 200 in the transfer system in normal position, with their vents 211 closed, all valves 310, 320 will remain normal. However, when the vane for "*t*," "*h*," "*e*," opens its vents as described, air will pass through tubings 220 and 250 into the lower chambers of the corresponding three units of valves 310, 320.

To follow the progress of operations: air enters lower chambers of the unit 31–*t*. The through-valves 310 are adjusted for quick response and branch valves 320 for slightly slower response. Thus valves 310 in units 31–*t*, 44–*h*, 59–*e* operate and extend air through their upper chambers to the series tubings 330 and through middle chambers of valves 310 in the whole series, thereby incapacitating all valve units except the first one, 31–*t*.

The valves 320 should be slow enough so that they will not operate before air has entered the whole series. The valve 310 in unit 31–*t* remains operated. The valves 310 in the other selected units 44–*h* and 59–*e* return to normal before their associated valves 320 can operate.

Then valve 320 in unit 31–*t* operates and applies air through its upper chamber to tubing 384, which is connected to the tubing in the printer multiple tubing 390 leading to the bellows 382 for the typewriter key 380 assigned to the letter "*t*." The valve stem 313 operates lever 322 which locks on catch 323 (see Fig. 9); the lever 322 operates cut-off valve 340 to cut off the air supply over tubing 250 to lower chambers in both valves 310 and 320. Thus valves 310 and 320 will release after a short interval thereby again extending suction from supply 160 through the series to the next pair of valves in unit 44–*h* which happens to be selected also.

With the associated tubing 250 open at the far end this pair of valves will then operate in the same manner, operating the key "*h*" in the typewriter, the valve 340 operating and locking. When both valves return to normal, valve 310 extends suction through a few succeeding unselected valves 310 to the selected unit 59–*e* for operation of key "*e*." Valve 310 again extends suction through the remaining unselected units in the series, to the unit 200–SP at the end of the series.

This unit is automatically selected to finish each code with a Spacing selection most of the time the Phonetic translator is operated. Thus when the switching device 180 was operated it opened the vent 178 for tubing 179 leading to the lower chambers of valve unit 200–SP. In the absence of suction throughout the sequence series at this time valve 310 in this unit remains unoperated. Upon arrival of suction after unit 59–*e* has operated, unit 200–SP operates for the operation of the Spacing bar SP in the typewriter, by the valve 320.

Thus the word "the" has been printed followed by a Spacing operation.

Beyond the unit 200–SP the series circuit 330 is extended into a unit 200–End of type 320 valves provided for different functions in the system at the end of a cycle. These valves are operated with slight delay when valve 310 of the 200–SP unit releases. Three such valves 320 are provided for the present system.

Thus when one of these valves 320 (the middle one) operates it admits air to the tubing 118 and the bellows 106 (Fig. 1) will operate, perhaps with a slight, controlled delay to pull up the stepping pawl 105. Near the full operation of the pawl, the de-vitalizing vent 108 is opened for operation of cut-off valve 162, which cuts off suction from most of the system, thereby also restoring pawl lever 105 which advances the tape driving roller and the tape one step. Thus the tape is advanced in the absence of suction in the reading vents 112.

During the return stroke of the pawl the vent 108 is closed thereby again releasing valve 162 for application of suction to the supply system 150 for the next cycle.

At the same time the stepping bellows 106 was operated bellows 351 were operated over tubing 352 by the upper valve 320 in unit 200–End.

These bellows operate release bars 350, each of which serves to release the valve stems 313 in a group of valves 320. Thus all valves 340 in the sequence series are restored.

The lower valve 320 in unit 200–End is connected over tubing 117 to operate bellows 172 for the timing device 170, which thus is restored to normal. Since this bellows is independent of the valve 162 which terminates a cycle, the switch 174 will condition the secondary bars 133 in the Phonetic translator for testing before the beginning of the next cycle.

For the sake of proper timing and speeding up a valve, such as the middle valve 320 in unit 200–End, may also be added to the unit 200–SP and operate therewith, for starting the devitalizing operations earlier than the various release operations by the unit 200–End.

The timing for the operation of valve 162 for shutting off suction may readily be adjusted so that all necessary functions may first be completed, particularly those controlled from the unit 200–End.

Assuming now that the record tape presents the code punching for letter "*f*" Final, or "—*f*," which is the code in Phonetic for the word "of."

All operations will be the same as before except that the primary bar 131 for "—*f*" will be set and the corresponding secondary bar 133 in Phonetic will be selected, the corresponding spelling unit 200 will be operated. This unit 200 represents the word "of" and thus controls two tubings 220 to the sequence valve units 300, which in this case may be 36–*o* and 55–*f*. This spelling unit 200 also controls tubing 182 to the timer equipment 180 and 170, as before, which shuts out Full Spelling, and selects sequence unit 200–SP. After the printing of the word "of" and spacing operation, suction is shut off and on again and the record tape is advanced another step for control of the next cycle.

It will now be assumed that the record tape presents the two code punchings simultaneously for letters "—*f*" and "—*t*" which is the code for the phrase "of the."

All operations will again be the same, except that two primary bars 131 for "—*f*" and "—*t*" will be set simultaneously and one corresponding secondary bar 133 will be selected by the two notches 138 cut for it in the primary bars (see translator unit 125, Fig. 1). The code spelling unit 200 in group 205, associated with the selected bar, may have vents 211 for all the tubings 220 connecting to the following sequence storing valves 300: 36–*o*, 55–*f*, 77–SP, 89–*t*, 125–*h*, 135–*e*, and to switch 180; but some saving in first cost may be attained by the alternative arrangement shown in Fig. 2, according to which the spelling unit 200 for "of the" has four vents 211, one for "of," one for "the," one for intermediate SP and one for switch 180. The first two vents connect to the bellows of two units 200 which represent "of" and "the," respectively, for operation of the two units, with the provision that the vanes of such two units are connected to sequence units 300 which will put the two words in their correct sequence.

It is evident that the two vanes 210 used singly for "the" and "of," as described above, are not in the proper sequence.

To meet this general situation common words, such as "the," "of," "it," "in" etc., may be represented by two or three vanes 210 each, which are connected into different regions in the sequence series, so that each such word, as "the," may be placed before or after other words in different phrases. Thus, as shown in Fig. 2, as an example, the word "the" is represented at two vanes 210, which both happen to be in group 204, the upper vane connects to 31–*t*, 44–*h*, 59–*e* and the lower vane connects to 89–*t*, 125–*h*, 135–*e*. With the vane for "of" connected to 36–*o*, 55–*f* it is evident that this vane may be used with the lower vane for "the" to satisfy the phrase.

Such vanes, as the two for "the" and one for "of" may be available for many other phrases by means of multiple connecting tubings 221 from their bellows 214 to vents on vanes 210 for the different phrases. In this manner the tubings 220 to the sequence multiple 250 will be needed only at one unit for each such word, instead of being repeated in all phrases using the word.

Thus in the present instance the vents in unit 200 for "of the" will, when opened by the secondary bar, operate the spelling unit for 36–*o*, 55–*f*, directly select sequence unit 77–SP to insert Space between the two words, operate the spelling unit for 89–*t*, 125–*h*, 135–*e* and operate the timer equipment 180. It should be noted that the branch valves 310 in the sequence series should be slow enough in operating to also allow for the time difference between direct selection, as in the case of 77–SP just referred to, and indirect selection through another spelling unit, as in the case of 36–*o*, 55–*f*, just referred to.

Thus the phrase "of the" will be printed with Space between the words and also following the words.

The following example of operation relates to Full Spelling with code punchings for the word "thee" and Space presented to the reading bar.

In the absence of a Phonetic code for this word it will be spelled out on record tape 100 and the primary bars operated in response thereto will be "*t*-," "*h*-," "*o*," "*e*."

Upon reapplication of suction to the system the timer 173 begins to work. Since no secondary bar 133 in Phonetic will respond to this setting, the timer will continue to work and finally operate switch 174 which disables Phonetic and applies air to the bellows 135 in the Full Spelling translator. The secondary bars 133 which will respond will be those for "*t*" and "*h*" and SP in unit 121 and "*oe*" in unit 123.

The tubings 140 from the vents 144 on bars "*t*," "*h*" and SP do not lead to spelling units, since no further spelling-out is required; they lead directly to the sequence tubing 250 for selection of sequence valve units, which may be 31–*t*, 44–*h*, 200–SP.

The vent 144 on the bar "*oe*" controls a spelling unit 200 in group 203 from which tubings 220 are connected up to tubings 250 for selection of sequence valve units, such as 59–*e*, 94–TM, 135–*e*. Thus the spelling will be in the proper sequence.

The unit 94–TM and other similar units are included in the sequence series to introduce a time interval between double letters, such as "*ee*," to give the typewriter key time for a double operation. The timing unit simply uses its own time to operate its cut-off valve 340 before extending the series circuit 330 to the second letter.

The reading vent 112 on the bar 101 for SP connects over tubing 119 directly to the multiple tubing 250 for the sequence series and in the presence of the punching for SP causes the operation of the unit 200–SP after the word "thee" has been printed.

Symbols TB and UC for the four different cases, referred to hereinbefore, are of course treated in exactly the same manner, since only the typewriter is affected by the punchings 110 which select the different cases and which pass operations through the system before any symbols are presented. Such punchings and those for other stunts usually may by-pass the translator and spelling units and pass directly to the sequence series. But when they are subject to combination they will require translation. Words with "first capital" hyphens or quotation marks, for example, may be related to the Phonetic translator, when used fairly frequently to reduce such time-consuming complications in the original tape recording. In such cases stunts, other than SP, may be included in the sequence series of outgoing code symbols. However stunts, signs and figures must usually be recorded singly in each row of punchings, since no particular sequence can be worked out for them.

It should be understood that stunt bars, as for TB and UC, in the typewriter must lock in operated position until the sequence series has been run down to 200–End to affect all characters, if any, recorded in the same row of punchings 110 in the record tape 100.

What is claimed is:

1. An automatic code translating system which comprises intersecting primary and secondary code members having code details for translation of an incoming code into an outgoing code, said secondary members being grouped into two divisions, each for selective response to any of the elements of the incoming code for translation into any of the elements of the outgoing code, and means effective upon the selective response of a secondary member in one division to a setting of said primary members for preventing translation in the other division for the same setting.

2. An automatic code translating system for double translation which comprises a translating device of intersecting primary and secondary code members for selective operation of said secondary members by settings of said primary members in response to an incoming code, said members having cooperating portions with code configurations in accordance with which two of said secondary members are responsive to the same setting of primary members for double use of the incoming code, said system further including control means responsive to the selection of one of said two secondary members in the translation into one variant of the outgoing code and effective in preventing translation by means of the other of said two secondary members into the other variant.

3. An automatic code translating system which comprises a translating device of intersecting primary and secondary code members, said device being divided into a first and a second division both including primary code members adapted for selection of secondary members in both divisions by the same setting of primary members for double use of the incoming code in the translation by the device into elements of two variants of the outgoing code, said system further including control means for rendering the selection of secondary members in said first division effective in preventing translation by means of said second division.

4. An automatic code translating system which comprises a plurality of primary code receiving members and a plurality of secondary members selectively operative in response to settings of said primary members, two of said secondary members being responsive to the same setting of said primary members, said system further comprising timing contact means for delaying the response of one of said two members without affecting the response of the other member.

5. An automatic code translating system which comprises a plurality of primary code receiving members and a plurality of secondary members selectively operative in response to settings of said primary members, said secondary members being grouped into two divisions, each division including a plurality of the said secondary members responsive to the same settings of said primary members as a plurality of the said secondary members in the other division, said system further comprising delay means for permitting one division to respond before the other division.

6. An automatic code translating system which comprises a plurality of primary code receiving members and a plurality of secondary members selectively operative in response to settings of said primary members, said members having code details for the selective operation of said secondary members, said secondary members being grouped into a first and a second division, and said details being arranged in said first division for selection of only one secondary member and in said second division for simultaneous selection of at least two secondary members by any setting of the primary members.

7. An automatic code translating system which comprises a plurality of primary code receiving members and a plurality of secondary members selectively operative in response to settings of said primary members, said members having code details for the selective operation of said secondary members, said secondary members being grouped into two divisions, and a plurality of said details being arranged for duplicate selections of secondary members, one in each division, said system further including automatic control means effective at each setting of primary members for admitting secondary members into selective response to each setting first in one and then in the other of said divisions.

8. An automatic code translating system which comprises intersecting primary and secondary code members having code details for translation of an incoming code into an outgoing code, said secondary members being grouped into two divisions, each for selective response to any of the elements of the incoming code for translation into any of the elements of the outgoing code, said system further comprising control means connected to prevent response by secondary members in one division to a setting of said primary members in the presence of selective response by a secondary member in the other division to the same setting of primary members.

9. An automatic code translating system which comprises a plurality of primary code receiving members and a plurality of secondary members selectively operative in response to settings of said primary members, said secondary members being grouped into two divisions, each including secondary members responsive to the same settings of primary members as secondary members in the other division, said system further including separate operating means in said two divisions for rendering said secondary members selectively operative and switching means for permitting said operating means in one division to operate and for preventing the operating means in the other division from operating unless a secondary member in said one division has not been selectively operated.

10. An automatic code translating system which comprises intersecting primary and secondary code members for the reception of elements of an incoming code and, in response thereto, for the translation of said code into elements of an outgoing code, said system further including automatic control means responsive to the selection of any one of a plurality of said secondary members for preventing translation by another plurality of said secondary members.

11. A translating system in accordance with claim 4 in which said delay means includes switching means having two positions for connecting secondary members in the two divisions, respectively, into response condition, and further includes timing means for delaying the switching from one position to the other.

12. An automatic code translating system in accordance with claim 1 which further comprises individual code spelling means for said secondary members, each code spelling means having an operating member connected for its operation to the associated secondary member and further having a plurality of code element details each adapted to transmit an element of the assigned outgoing code by the operation of the said operating member due to selection by an incoming code, each code spelling means in said one division having an additional contacting detail connected for effectively preventing said translation by the other division.

13. An automatic code translating system which comprises primary and secondary code members for the reception of any of the elements of an incoming code and, in response thereto, for the translation of said code into any of the elements of an outgoing code and individual code spelling means for a plurality of said secondary members, each including an operating member and a plurality of code element details, each detail being adapted to transmit an element of the assigned outgoing code in response simultaneously by said details to operation of said operating member by the associated secondary member due to selection by an incoming code.

14. A translating system in accordance with claim 13 in which said code spelling means has an additional control detail connected for effectively preventing the operation of a plurality of other similar coding means.

15. An automatic code translating system which comprises primary and secondary code members for the reception of any of the elements of an incoming code and in response thereto, for the translation of said code into any of the elements of an outgoing code and code spelling means for each of said secondary members for setting up the code elements of each outgoing code in response to selection thereof, said system further including automatic control means responsive to the selective operation of any one of a plurality of said code spelling means for preventing the operation of another plurality of said coding means.

16. A translating system in accordance with claim 13 which further comprises group switching means for in one position rendering the code spelling means for said plurality of secondary members effective and for in another position rendering another plurality of code spelling means effective, to permit use of incoming codes for more than one variant of outgoing codes.

17. A translating system in accordance with claim 13 which further comprises two-position, slow operating group switching means for in one position rendering the code spelling means for said plurality of secondary members effective and for in the other position rendering another plurality of code spelling means effective, to permit double use of incoming codes for two variants of outgoing codes, said code spelling means for the first said plurality of secondary members having an additional control detail for the operation of said group switching means into said one position, said switching means being biased for operation into said other position.

18. An automatic code translating system which comprises intersecting primary and secondary code bars for the reception of elements of incoming codes and, in response thereto, for the translation of said codes into outgoing codes, code spelling means for each secondary bar which includes an operating member connected to said secondary bar for operation thereby in response to a setting of said primary bars, and which further includes a plurality of code element details representing the elements of the assigned outgoing code, said system further comprising a common operating bail for admission of a first group of secondary bars into testing relation with said primary bars and another similar operating bail for another group of secondary bars, two-position slow operating group switching means for controlling the operation of said two operating bails and biased into second position for operation of the bail for said other group of bars, and end control means temporarily effective at the end of a translating cycle of operations for operating said group switching means into first position for the operation of the bail for said first group of bars, said code spelling means for said first group of bars including an additional control detal connected for, when selected, holding said group switching means in first position to hold the bail for said first group of bars operated until the end of the translating cycle and for preventing said switching means from returning to second position.

19. An automatic code translating system including a translating device for conversion of incoming codes into outgoing codes and a sequence control series of sequence units connected into a continuous series in a predetermined order for operation one at a time in said order in response to translated code elements impressed simultaneously upon said series by said device for repeating the code elements in said order into a receiving equipment, said sequence units being individually assigned to a single element of the outgoing code alphabet and all the code elements being assigned individually to corresponding sequence units.

20. A translating system in accordance with claim 19 in which each of said units includes repeating means for the assigned outgoing code element, series switching means for disabling the succeeding portion of the series during the repeating action of the unit and cut-off means responsive to operation by said repeating means for restoring the unit to unoperated condition and thereby restoring the next succeeding selected unit to operating condition upon completed repeating action by the first said unit.

21. A translating system in accordance with claim 19 in which each sequence unit includes a quick series switching device for normally closing said control series through the unit and for temporarily opening the series during the repeating action by the unit, and a slower repeating device for repeating the assigned code element into the receiving equipment shortly after the opening of the series, said repeating device being slow enough to permit opening of the series by a preceding unit in time to prevent its own operation out of the proper sequence, each unit further including locking cut-off means responsive to operation by said repeating device for restoring the said unit to unoperated condition, thereby again completing the control series for operation of the next selected sequence unit.

22. An automatic code translating system which comprises an input side for receiving incoming code elements for translation and an output side for repeating the translated outgoing code elements into a receiving equipment within each operating cycle of the system, said output side including a continuous series of sequence units responsive to code elements translated by the system, each unit representing an assigned individual code element, a plurality of said units scattered along the series at varying intervals representing the same code element, and selected units being operative one at a time and in a predetermined order along the series for repeating their individual assigned code elements one at a time into the receiving equipment during the operating cycle.

23. An automatic code translating system which comprises intersecting primary and secondary code members for the reception of code elements of incoming codes and, in response thereto, for the translation of said codes into code elements of outgoing codes, individual code spelling means for a plurality of said secondary members each having an operating member responsive to selection of the secondary member and a plurality of code element details, one for each outgoing code element assigned to the selected secondary member, and a continuous series of sequence units connected to said code element details for repeating the corresponding outgoing code elements one at a time into a receiving equipment.

24. A translating system in accordance with claim 23 in which each of a plurality of said code spelling means has an additional control detail connected to effectively prevent the operation of a plurality of other similar code spelling means.

25. A translating system in accordance with claim 23 in which a plurality of said code element details on different code spelling means are multiplied together for connection to one of said sequence units for repeating by the unit of a single code element assigned to said code element details and the output sides of a plurality of said sequence units scattered through the series for the said single code element are multiplied together for repeating said single code element into said receiving equipment.

26. An automatic code translating system for code elements grouped into vowels, initial consonants and final consonants for syllable transcription, said system comprising a translating device for conversion of incoming codes into outgoing codes and having intersecting common primary and grouped secondary code members, and individual code spelling means for a plurality of said secondary members including assigned code element details, said system further comprising a continuous series of sequence units, each unit being connected to a plurality of said details for repeating the assigned outgoing code element into a receiving equipment and each code spelling means being connected to a plurality of said sequence units to provide for repeating of the outgoing code elements in changeable sequence in accordance with selection of said secondary code members.

27. A translating system in accordance with claim 10 in which said secondary members are grouped into a first division and a second division, each including secondary members responsive to the same incoming code elements as members in the other division, and said secondary members in both divisions are assigned to translation of initial, vowel and final incoming code elements.

28. A translating system in accordance with claim 26 in which said secondary members are grouped into a first division and a second division, each including members responsive to the same incoming code elements as members in the other division, and said secondary members in both divisions are assigned to translation of initial, vowel and final incoming code elements, the operation of said secondary members in the first division in response to settings by the common primary members being timed in relation to the operation of secondary members in the second division to permit a secondary member in the first division to respond first to a primary setting and to in that case prevent response by a secondary member in the second division to the same primary setting.

29. An automatic code translating system including primary and secondary code members for translating an incoming code into an outgoing code and a timing device, said secondary members being grouped into two divisions and being responsive in both divisions to initial, vowel and final code elements of the incoming code and being connected and timed by said device for operation in one division relative to members in the other division to respond second to assigned incoming code elements after the testing first and failure to operate by secondary members in the other division in response to the same incoming code elements.

30. A translating system in accordance with claim 29 which further includes timer-controlled switching means for connecting the secondary members in the other division for first selection by incoming code elements and for connecting the secondary members in said one division for subsequent selection by the same code elements, the timed switching of said switching means being prevented by the full response of a member in said other division.

31. A translating system in accordance with claim 29 which further includes individual code spelling means for said secondary members in both divisions connected for operation by its associated member to transmit the assigned code elements and timer-controlled switching means for first rendering all the code spelling means in said other division operative by their associated members in response to incoming code elements and thereafter all the code spelling means in said one division in response to the same code elements, each of said code spelling means in said other division having control means connected for preventing the switching of said switching means to said one division when the code spelling means in said other division has been selectively operated by the code elements.

32. An automatic translating system including primary and secondary code members for translating an incoming code into an outgoing code, and a timing device for normally holding a plurality of said secondary members clear of said primary members and timed to admit said plurality of secondary members for selection before the admission of another plurality of secondary members for selection.

33. An automatic translating system including primary and secondary code members for translating an incoming code into an outgoing code, a counter balanced operating member for a plurality of said secondary members and control contact means associated with each secondary member including spring means for normal pressing into contact by said secondary member in normal and testing positions and lever means for alternate opening of contact and for neutralizing of said spring means by fully selected operation of said secondary member to substantially maintain the balancing of said operating member.

34. An automatic translating system including primary and secondary code members for translating an incoming code into an outgoing code, individual code spelling means for a plurality of said secondary members each having code element details for spelling out its assigned code combination, said system further including a continuous series of sequence code units for repeating the outgoing code elements as determined by selected code spelling means, said series of units having an input multiple set-up of individual input connections, and said details being associated with assigned input connections in accordance with translated incoming codes.

35. An automatic translating system including primary and secondary code members for translating an incoming code into an outgoing code, individual code spelling means for a plurality of said secondary members each having code element details for spelling out its assigned code combination, said system further including a continuous series of sequence code units for repeating the outgoing code elements as determined by selected code spelling means, said series of units having an input multiple set-up of individual input connections, and said details being associated with assigned input connections in accordance with translated incoming codes, each of said sequence units further comprising a set of pneumatic valves, said code element details being air vents and said individual input connections to said valves being air passages, each of said air passages being connected through said multiple set-up to a plurality of said air vents for selective operation of the associated sequence unit in varying relations to other selected units for different assigned outgoing codes.

36. A translating system in accordance with claim 35 in which said multiple set-up includes a plurality of successive rack-like structures having through passages for continuation of said input connections, each of said structures having a plurality of access passages to each of said input connections for the code element details on a plurality of said code spelling means.

37. An automatic translating system comprising primary and secondary code means for translating an incoming code into an outgoing code, each of said secondary code means including code element details for spelling out its assigned outgoing code combination, said system further comprising a continuous series of sequence code units for repeating sequentially individual code elements as determined by selected code element details, each of said sequence code units including a set of pneumatic valves and each of said code element details being an air vent and being connected to an assigned sequence unit for operation thereof.

38. A translating system in accordance with claim 34 in which each of said sequence units comprises a fast operating valve for disabling subsequent units and a slower operating valve for repeating the outgoing code element when the unit is selected by one of said details.

39. In an automatic code translating system a continuous series of sequence code units for repeating sequentially individual code elements of an outgoing code combination as translated by the system, each of said units including a fast operating pneumatic valve serially connected with similar valves in the other units for temporarily disabling subsequent valves while operated, a slower operating pneumatic valve for repeating its assigned outgoing code element when selected, and locking switching means responsive to said slower valve for disabling both said valves of the unit and thereby conditioning the next selected unit along the series for repeating, said series further including an end unit conditioned for operation after completed repeating by the series to release all said switching means and restoring the series for the next cycle.

References Cited in the file of this patent

UNITED STATES PATENTS 2,351,663 Clark ------------------ June 20, 1944